United States Patent [19]

Pall

[11] 4,170,556
[45] Oct. 9, 1979

[54] FILTER ELEMENTS AND FILTER ASSEMBLIES WITH THERMAL SEAL

[75] Inventor: David B. Pall, Roslyn Estates, N.Y.

[73] Assignee: Pall Corporation, Glen Cove, N.Y.

[21] Appl. No.: 361,931

[22] Filed: May 21, 1973

[51] Int. Cl.² .................. B01D 35/18; B01D 29/04
[52] U.S. Cl. ........................ 210/181; 210/DIG. 15; 210/437; 210/457; 285/187
[58] Field of Search ............ 210/232, 457, 444, 454, 210/446; 285/187, DIG. 5, DIG. 6

[56] References Cited

U.S. PATENT DOCUMENTS

| | | | |
|---|---|---|---|
| 381,670 | 4/1888 | Botsford | 285/DIG. 6 |
| 1,046,600 | 12/1912 | Kahler | 285/187 X |
| 1,856,415 | 5/1932 | Halpern et al. | 285/DIG. 6 |
| 1,883,509 | 10/1932 | Boone | 285/187 |
| 2,732,950 | 1/1956 | Height et al. | 210/437 X |
| 2,739,713 | 3/1956 | Robinson | 210/437 X |
| 2,932,400 | 4/1960 | Scavuzzo | 210/444 |
| 3,163,449 | 12/1964 | Westfall | 285/187 |
| 3,378,283 | 4/1968 | Boocock et al. | 285/187 |
| 3,507,522 | 4/1970 | Froman et al. | 285/187 |
| 3,672,162 | 6/1972 | Rygelis et al. | 285/DIG. 6 |

FOREIGN PATENT DOCUMENTS 767534  9/1964 Canada .......................... 285/DIG. 5

OTHER PUBLICATIONS

Advances in Cryogenic Engineering, vol. 7, Jul. 1955, pp. 556–561, S.E. Logan.

Primary Examiner—Theodore A. Granger

[57] ABSTRACT

Filter elements and filter assemblies are provided for use at any operating temperatures, having the filter elements disposed in sealing relationship in a leak-tight seal formed at such operating temperature by thermal expansion of at least two sealing components. Thus, at a lower or higher temperature, such as normal atmospheric temperature, the sealing components are contracted, and release the filter elements from sealing engagement, for removal and replacement, while at the selected operating temperature such sealing components are expanded, to form a thermal leak-tight seal therebetween.

17 Claims, 4 Drawing Figures

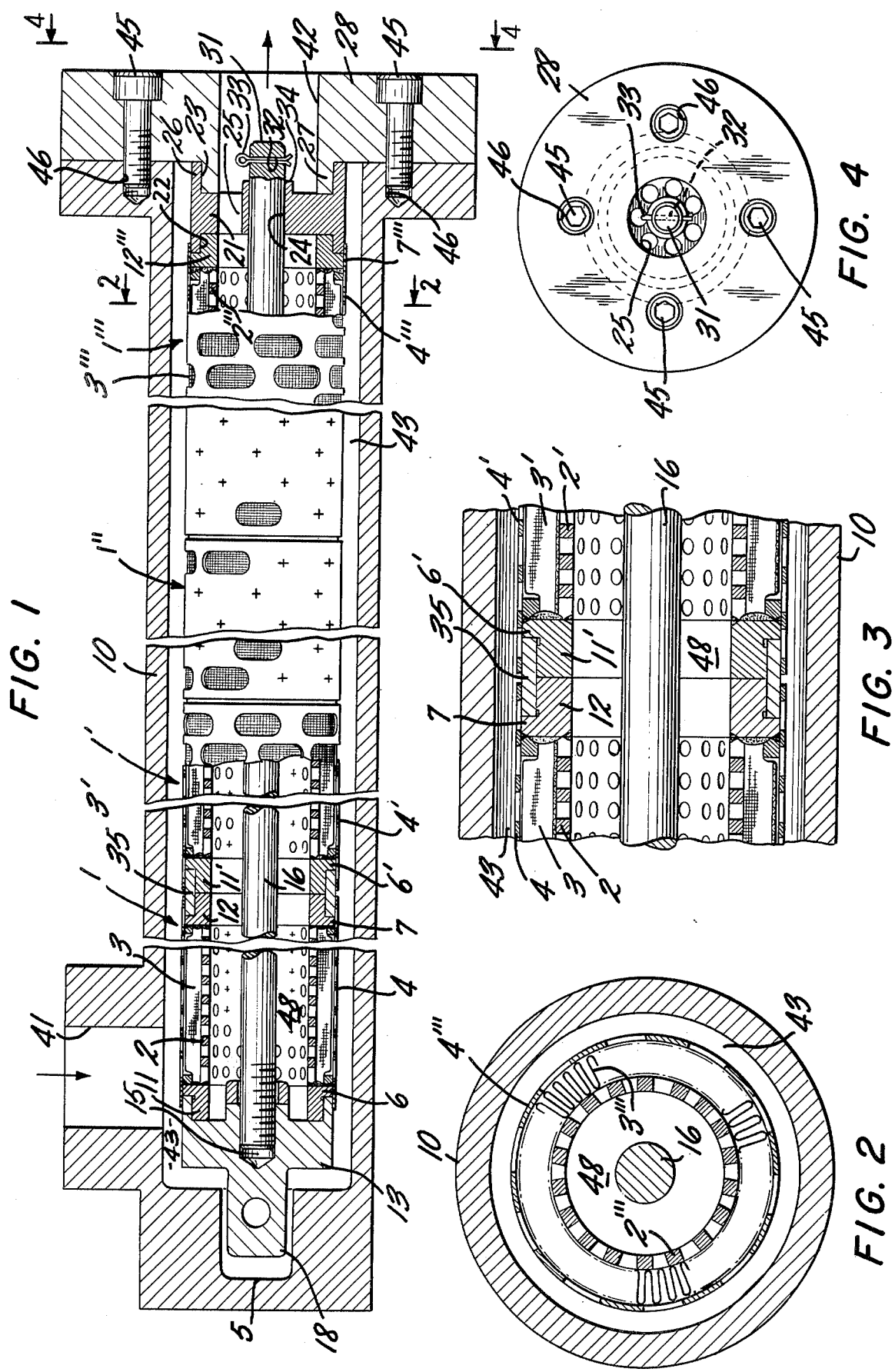

FILTER ELEMENTS AND FILTER ASSEMBLIES WITH THERMAL SEAL

The leak-tight fitting of modular filter elements together, and/or to a filter assembly operated at elevated temperatures, particularly with corrosive liquids, poses serious problems. Normally, a resilient sealing element such as an O-ring or V-ring is used to seal the filter element against leakage by-passing the filter. The rate and extent of attack of the fluid upon a sealing element increases rapidly as temperature increases. Moreover, many articles used for sealing elements are resilient, and, while they may have a long life at low temperatures, their resiliency decreases and their life rapidly shortens at elevated temperatures. As the resiliency of the sealing element diminishes, its ability to maintain a leak-tight seal at high fluid operating pressure also diminishes, and leaks may develop across the seal, resulting in by-pass of unfiltered fluid to the filtered fluid line.

Metal-to-metal seals have been proposed, using metal-faced sealing elements such as the V-ring seal of U.S. Pat. No. 3,093,581, dated June 11, 1963 to David B. Pall et al. However, such sealing elements have a low resiliency relative to rubber and plastic elements, and even the provision of a resilient core does not make it possible to provide a leak-tight seal under all circumstances. Moreover, as the metal facing ages, its springiness may decrease. This type of seal requires a large constant axial load to be applied, which increases the size and complexity and cost of the seal assembly.

In accordance with the invention, filter elements and filter assemblies are provided in which the filter element is retained in sealing relationship with another filter element and/or the filter unit by a pair of sealing components engaging each other in a leak-tight seal and having a differential expansion coefficient $\Delta K_t$ with temperature. The sealing components are formed so as to provide a small clearance therebetween at normal temperatures, but at elevated temperatures since the coefficient of expansion of one of the elements is greater than the other, this clearance is taken up by the relative change in dimensions of the components, and thus, at operating temperatures, the sealing components engage each other in a leak-tight seal. A first sealing component can be associated with the filter element and a second sealing component arranged for coupling the first sealing component to a housing structure or to the first sealing component of another filter element, such as with the open end cap of a cylindrical filter element, so that a leak-tight seal is provided therebetween, whereby the filter element is held to the filter unit, across the line of flow of fluid from the inlet to the outlet of the filter assembly, or to another filter element.

The filter element for disposition in a filter assembly across the line of flow of fluid therethrough in sealing relationship in the assembly via a seal that is thermally expanded at operating temperatures comprises, in combination, a filter element; a first sealing component operatively associated with the filter element; a second sealing component operatively associated with the first sealing component, and formed for operative association with the filter assembly; the first and second sealing components engaging each other in a component-to-component seal, and having a differential thermal expansion coefficient $\Delta K_t$ with temperature; the sealing components being formed so as to provide a small clearance therebetween at a first non-operating temperature, and at a second operating temperature the expansion of one of the components being sufficiently greater than that of the other that this clearance is taken up by expansion of the components, so that the sealing components engage each other in a component-to-component leak-tight seal.

The filter element for coupling to another filter element to form a filter element assembly in sealing relationship in the assembly via a seal that is thermally expanded at operating temperatures comprises in combination a filter element; a first sealing component operatively associated with the filter element; a second sealing component operatively associated with the first sealing component, and formed for operative association with a first sealing component of another filter element; the first and second sealing components engaging each other in a component-to-component seal, and having a differential thermal expansion coefficient $\Delta K_t$ with temperature; the sealing components being formed so as to provide a small clearance therebetween at a first non-operating temperature, and at a second operating temperature the expansion of one of the components being sufficiently greater than that of the other that this clearance is taken up by expansion of the components, so that the sealing components engage each other in a component-to-component leak-tight seal.

Also provided by the invention is a filter assembly having a filter element disposed across the line of flow of fluid through the filter assembly in sealing relationship in the assembly through a seal that is thermally expanded at elevated temperatures, comprising, in combination, a filter element; a filter unit structure; a first sealing component operatively associated with the filter element; a second sealing component operatively associated with the filter unit structure; the first and second sealing components engaging each other in a component-to-component seal, and having a differential thermal expansion coefficient $\Delta K_t$, the sealing components being formed so as to provide a small clearance therebetween at a first non-operating temperature, and at a second operating temperature the expansion of one of the components being sufficiently greater than that of the other that this clearance is taken up by expansion of the components so that the sealing components engage each other in a component-to-component leak-tight seal.

Such filter assemblies may include one filter element of the invention or a plurality of such elements, in assembled relationship with thermal seals of the invention.

The expansion with increase of temperature of the sealing components is determined by their temperature coefficient of linear expansion:

$$L_2 = L_1(1 + K_t \Delta t)$$

where $L_1$ is the dimension at temperature $t_1$, and $L_2$ is the dimension at temperature $t_2$, $K_t$ is the coefficient of expansion, and $\Delta t = t_2 - t_1$.

The difference $K_{ta} - K_{tb}$ of the coefficients of expansion of the materials a and b used for the two sealing components is referred to herein as the differential coefficient of expansion $\Delta K_t$.

The filter assembly of the invention can be arranged to form a thermal seal at any desired operating temperature. It is only necessary that the filter assembly be assembled at a lower-than-operating temperature, where the sealing components have a positive differential coefficient of expansion, and at a higher-than-operating temperature where the sealing components have a negative differential coefficient of expansion.

For applications in which the filter assembly is to be used at temperatures below room temperature, for example for the filtration of chilled fluids, or for service with liquefied air, nitrogen, oxygen, helium, liquid propellants, ammonia, carbon dioxide and other gases, the seal functions well, but for such application it is preferred that the inner member of a ring seal have the lower coefficient of expansion.

The sealing system of this invention can also be used in normal ambient temperature applications by assembling the element at higher (or lower) temperature, as convenient, and at elevated temperatures, in the filtration as liquids of materials normally solid at ambient temperature, or of too high a viscosity at lower temperatures. Operating temperatures of from 200° to 500° C. are practical temperatures for the filter assembly of the invention.

In general, the materials of which the sealing components of the invention are formed preferably have a positive or negative differential coefficient of expansion $\Delta K_t$ larger than about $5 \times 10^{-6}$ per °C. Both sealing components can be, and preferably are, of similar metals, and both preferably are stainless steel alloys of differing coefficients of expansion. Any metal can of course be used, according to its resistance to corrosion by the fluid being processed, such as iron, steel, nickel, chromium, nickel alloys, such as Monel, aluminum, brass, bronze, copper, silver, beryllium, tantalum, titanium, tungsten, and vanadium. Plastics can also be used, either with other plastics or with metals. Exemplary are polyethylene, polypropylene, polyamides, polystyrene, urea-formaldehyde, polytetrafluoroethylene, polyvinylidene chloride, polyesters, polyoxymethylene and polycarbonate resins.

Typical material pairs for use as sealing components in the filter assemblies of the invention, their coefficients of expansion $K_t$, and $\Delta K_t$ are approximately as follows:

| Component A | | $\Delta K_t \times 10^6$ | Component B | |
|---|---|---|---|---|
| Composition | $K_t \times 10^6$ (per °C.) | (per °C.) | Composition | $K_t \times 10^6$ (per °C.) |
| AISI Type 304 stainless steel | 17.8 | 7.2 | AISI Type 440C stainless steel | 10.6 |
| Aluminum Alloy 6061T6 | 25.4 | 14.8 | AISI Type 440C stainless steel | 10.6 |
| AISI type 304 stainless steel | 17.8 | 15.3 | INVAR | 2.5 |

The lower limit of $\Delta K_t$ which can be used is determined by (a) the difference between the temperature at which the assembly is assembled, and that at which the filter assembly must operate, and (b) the precision with which the two sealing components can be machined.

For example, if the seal is between rings whose nominal diameter is 1 inch, the temperature differential is 300° C., and the precision of machining is ±0.00005 inch (a tolerance commonly maintained by some types of equipment) then:

(a) Outer component can be machined to 1.00006 inch ±0.00005 inch.

(b) Inner component can be machined to 0.99994 inch ±0.00005 inch.

Under the worst conditions of tolerance, a differential expansion of 0.00022 inch ($22 \times 10^{-5}$) minimum is required to obtain sealing. If this must be reached over a 300° C. range, the minimum differential must be $$(22 \times 10^{-5}/300) = 0.73 \times 10^{-6}$$

In practice, one would prefer to select a pair with $\Delta K_t$ equal to several times this number, and thus hold more open tolerances, in order to minimize machining costs.

One means by which close sealing tolerances can be obtained at relatively small cost is to machine the two sealing surfaces to a cone frustrum configuration, with a very small included angle, for example under 6°.

The sealing components can have any configuration accomodating the filter element and filter unit structure desired. One sealing component is attached to the filter element in a leak-tight seal. In the case of a cylindrical or tubular or similar filter element the sealing component desirably takes the form of a ring attached to the open end of the element, or part thereof. In the case of a filter disc, the sealing component is desirably a frame or part thereof to which the filter disc is attached. The other sealing component is attached to or adapted to be attached to the filter housing permanently or removably.

The sealing elements are shaped to engage each other over a sufficient distance to form a leak-tight seal at operating temperature.

The sealing components can for example have tubular and concentric portions, so that one portion fits over the other portion with a small clearance therebetween at a temperature below operating temperature. The adjacent juxtaposed surfaces are sealing surfaces, and upon expansion to or below operating temperature form a leak-tight seal locking the two components together.

The sealing components can also have pin and socket portions. The juxtaposed faces of the two components can be sealing surfaces, and when the pins are fitted into the sockets and the juxtaposed faces butted together, a leak-tight end seal is formed upon expansion at operating temperature. This type of seal is useful when space does not permit a side seal.

The sealing components can also join together in a bayonet joint, or a threaded pin and socket joint. Other variations will be apparent.

The clearance between the components need only be great enough to permit their ready separation, for removal from the filter assembly. From 0.0001 to 0.0002 inch is adequate, but higher clearances can of course be used. The only limitation is that the clearance be taken up by expansion of the components at operating temperature to form a leak-tight seal.

For a leak-tight seal, the sealing surfaces of each component must of course be smooth and conform closely to one another. They can be flat, or curved, such as convex or concave, but if curved, the curves should have radii of curvature corresponding to the clearance desired.

The clearance can exist at any temperature below or above operating temperature, but for convenience it is usually preferred that it be formed at ambient temperature or below. Similarly, the leak-tight seal must exist at operating temperature, but can be formed at any temperature below or above operating temperature, to a temperature just above or below that at which the clearance must be present. Thus, over the range of temperatures between the clearance temperature and the operating temperature there can exist a clearance, or a leak-tight seal, or each can exist over a portion of the range. The coefficient of expansion of course is taken into account in determining which of the three conditions can be tolerated.

Preferred embodiments of the invention are shown in the drawings, in which:

FIG. 1 represents a longitudinal sectional view of an array of modular filter elements in accordance with the invention, showing the sealing components for sealing it in place in a filter housing and for sealing modular filter element units together;

FIG. 2 is a cross-sectional view of the filter element and of the sealing components taken along the lines 2—2 of FIG. 1, and looking in the direction of the arrows;

FIG. 3 represents a detail longitudinal section view of one joint between the modular filter element units of the array of filter elements of FIG. 1;

FIG. 4 represents a cross-sectional view of the filter assembly at the outlet end taken along the lines 4—4 of FIG. 1.

The array of modular filter elements constituting a filter assembly of FIGS. 1 to 4 comprises a plurality (in this case four) of modular filter elements 1, 1', 1'', 1''', each in a cylindrical configuration, with an internal core 2, 2', 2'', 2''', a corrugated (see FIG. 2) cylindrical filter element 3, 3', 3'', 3''', of sinter-bonded wire mesh, and an external cylindrical shield 4, 4', 4'', 4'''. The internal and external shields are each of apertured or perforated sheet material, preferably of metal, and in this instance of Type 304 stainless steel, as in the filter mesh.

The open ends of the cylindrical filter elements 1, 1', 1'', 1''', are closed off by the end caps 6, 6', (6'', 6''' not shown), 7, 7'' (7', 7''' not shown), each of which has an open central passage therethrough. Each end cap is of Type 304 stainless steel, and has an annular flange 11, 11', (11'', 11''' not shown), extending axially and outwardly about the passages. The flanges 11, 11', 11'', 11''', 12, 12', 12'', 12''', constitute a first sealing component of the thermal seal of the invention.

End cap 6 has its open central passage closed off by a blind adaptor 13, constituting a second sealing component of the thermal seal of the invention, and having an annular recess into which the flange 11 fits with a small clearance at a lower non-operating ambient temperature, with a central threaded bore 15 receiving the threaded end of tie rod 16. The other side of the adaptor 13 has a projecting pin 18, which fits with a small clearance both at nonoperating and at operating temperatures in a socket 5 in the filter housing 10, also of Type 304 stainless steel. The adaptor 13 is of Type 440C stainless steel, with a lower temperature coefficient of expansion than Type 304. Type 304 stainless steel has an expansion coefficient $K_{t1}$ of $17.8 \times 10^{-6}$ per °C. while Type 440C stainless steel has an expansion coefficient $K_{t2}$ of $10.6 \times 10^{-6}$ per °C., giving a differential expansion coefficient $\Delta K_t$ of $7.2 \times 10^{-6}$ per °C.

The clearance between the blind adaptor 13 and the flange 11 of end cap 6 at nonoperating ambient temperature is from 0.0004 to 0.0020 inch, and the clearance of pin 18 with the housing wall at the socket 5 at nonoperating ambient temperature is from 0.003 inch minimum, allowing free and easy disassembly of the adaptor from the housing at ambient temperature. However, at operating temperature, in this instance 300° C., relative expansion of adaptor 13 with respect to flange 11 reduces the clearance therebetween to zero, and gives an absolutely leak-tight component-to-component seal with these components at this temperature, while still leaving a small clearance between adaptor 13 and housing 10.

At the opposite end of the filter assembly, at end cap 7''' of filter element 1''' is an annular adaptor 21, constituting a second sealing component of the thermal seal of the invention, the flange 12''' of end cap 7''' constituting a first sealing component. The adaptor 21 is also of Type 440C stainless steel, with an annular recess 22 in which the annular flange 12''' of the end cap 7''' fits, with a clearance of 0.0004 to 0.0020 inch at nonoperating ambient temperature. At operating temperature, in this instance 300° C., relative expansion of the two sealing components gives absolutely leak-tight sealing therebetween.

The adaptor 21 at its opposite side has a second annular recess 23, a central passage 24, and seven offset axial passages 25 (best seen in FIG. 4). The peripheral flange 26 of the adaptor 21 embraces annular projection 27 of housing cap 28. Since the housing 10 is of Type 304 stainless steel, and adaptor 21 is of Type 440C stainless steel, although there is a clearance of 0.0004 to 0.0020 inch therebetween at nonoperating ambient temperature, relative expansion of the two, at operating temperature, 300° C., gives absolutely leak-tight sealing.

The aperture 24 receives the end 31 of tie rod 16. The tie rod end has a radial passage 32 receiving cotter pin 33, which is spaced from the land 34 on adaptor 21 a sufficient distance to allow for expansion without abutting the land at operating temperature.

The filter element assembly in this case is made of four cylindrical modular filter elements 1, 1', 1'', 1''', each with flanged end caps 6, 6', 6'', 6''', 7, 7', 7'', 7''', which are attached together by joiner sleeves 35, also of Type 440C stainless steel, fitting over the intermediate flanges 11', 11'', 11''', 12, 12', 12'' of the end caps 6', 6'', 6''', 7, 7', 7'', which are of Type 304 stainless steel. The sleeves 35 as the second sealing component of these thermal seals are made of Type 440C stainless steel and give absolutely leak-tight sealing with the flanges of these end caps at operating temperature, due to differential thermal expansion, while at nonoperating ambient temperature there is a small clearance therebetween, from 0.0004 to 0.0020 inch.

The clearance permits easy assembly and disassembly of the filter modular units from each other and from the filter housing structure.

It will now be seen that the tie rod 16 holds the filter elements 1, 1', 1'', 1''' together before the thermal seal is formed, being threaded into the bore 15 of adapter 13 at one end, and retaining the adaptor 21 by cotter pin 33 at the other end.

The outer end portions of the adaptors 13 and 21 can be shaped to fit any filter housing structure.

In the filter assembly shown in FIGS. 1 to 4, the filter housing 10 has an inlet passage 41 and an outlet passage 42, opening into a filter chamber 43. The outlet passage 42 is through the housing cap 28, which closes off the open end of chamber 43, and is attached to the housing 10 by four screws 45, which thread into sockets 46 in the housing.

The filter housing cap 28 and end cap 7''' to which the adaptor 21 is attached and the adaptor 13 to which the end cap 6 is attached after the thermal seal therebetween has formed close off the line of fluid flow from the inlet 41 to the outlet 42 of the filter housing 10, and compel all fluid flow through the housing to pass through the filter elements 1, 1', 1", 1'''. The filter assembly thus is disposed in the chamber 43 in a manner to intercept liquid flow from the inlet 41 to the outlet 42 through the chamber.

A by-pass line can be provided, with a relief valve arranged to open at a predetermined pressure differential between inlet and outlet passages 41 and 42, but this is not essential.

A pressure indicator can be provided, responsive to a predetermined pressure differential, usually less than that at which the relief valve opens, between the inlet and outlet passages, to indicate a clogged condition of the filter, but this is not essential.

Thus, liquid in normal flow enters the housing 10 via inlet 41, passes into chamber 43 outside the filter shield 4, passes through the shield, filter mesh 3 and core 2 into the open space 48 enclosed thereby, and emerges from the filter assembly as filtered flow via outlet 42.

Replacement of one or more of the filter elements at ambient temperature is quite easy. The operator merely unscrews the screws 45, releasing the cap 28, which is removed, thus exposing the filter elements. The adaptor 21 is now loose, having contracted so that it no longer seals against flange 12", but instead there is a small clearance therebetween. The adaptor 13 is also loose in the socket 5. The sleeves 35 are also loose on flanges 11', 11", 11''', 12, 12', 12". Hence the filter elements 1, 1', 1", 1''' can be removed and replaced, by removing cotter pin 33 and slipping them off the pin 16. The replacement elements are then assembled with interposed sleeves 35, 35', 35", and the cotter pin reinserted. The replacement assembly is then put in the housing 10. Replacement of the cap 28 on the housing 10 then brings the filter elements into the position shown in FIGS. 1 to 4 and when the assembly is brought to operating temperature, the leak-tight thermal seals between the rings 35, adaptors 13 and 21, the flanges 11', 11", 11''', 12, 12', 12", and the flange 26 and annulus 23, are re-established.

The filter elements as shown in the drawing are cylindrical, but any closed (in cross-section) form can be used, as well as flat sheets. The filter element can be supplied with any type of fitting to secure it in the unit structure of the filter assembly in a manner to ensure that all liquid flow passes through the filter. It is usually preferable to corrugate or fold the filter sheet, to provide maximum surface area in a small space.

Other variations will be apparent to those skilled in the filter art.

While the metal parts of the filter assembly shown are all made of stainless steel, which is a preferred material because of its resistance to corrosion by many types of fluids and its high temperature resistance, other types of metals can be used, as well as other types of stainless steel alloys in place of the stainless alloys illustrated and non-metals such as thermoplastic and thermosetting synthetic resins. Thus, for example, the stainless alloys can be any AISI Type 300 series, or any 400 series, or can be age hardening alloys such as 17-7PH, or 17-4 PH.

For convenience of assembly and disassembly, the sealing component to be attached to the filter unit structure is normally marketed in combination with the sealing component attached to the filter element, ready for use in a filter assembly of any desired unit structure or design. This type of unit is readily fitted by a purchaser into his existing unit, and is therefore preferred.

However, it is also possible to attach in a permanent way to the filter unit or housing structure the sealing component to which the sealing component attached to the filter element seals at operating temperatures. In this event, the filter element would be marketed separately with its sealing component attached, for attachment to the sealing component on site in the filter unit structure.

Having regard to the foregoing disclosure, the following is claimed as the inventive and patentable embodiments thereof:

1. A filter assembly having a filter element in sealing relationship in the assembly through a seal that is thermally expanded at operating temperatures, comprising, in combination, a housing; a fluid chamber in the housing; a fluid inlet and a fluid outlet in the housing in flow communication with the fluid chamber; a cylindrical filter element disposed in the fluid chamber across the line of flow of fluid from the inlet to the outlet through the filter assembly and having a filter sheet in the form of a cylinder whose open ends are capped by end caps having open central passages therethrough; the thermally expanded seal being effected between components consisting of a first cylindrical sealing component operatively associated with each of the end caps of the filter element comprising an annular axial flange extending axially and outwardly from the end caps about the central passages thereof; and a second cylindrical sealing component operatively associated with the filter housing and comprising cylindrical adaptors having on one side a first annular recess into which the annular flanges of the end caps fit; the end cap annular flanges and annular adaptor together constituting first and second thermally sealing components having cylindrical and concentric portions whose opposed mating cylindrical concentric side surfaces are side-to-side sealing surfaces, one adaptor having on its other side a second annular recess; an annular projection on the housing extending into the second annular recess; the second adaptor and annular recess and the housing projection together constituting another set of first and second thermally sealing components having cylindrical and concentric portions whose opposed mating cylindrical concentric side surfaces are side-to-side sealing surfaces; and another adaptor having on its other side a portion keyed with a mating portion on the housing to locate the other side of the filter element with respect to the housing; there being a small clearance between each set of such cylindrical sealing surfaces within the range from about 0.0004 to about 0.002 inch at a first relatively lower nonoperating temperature, and a leak-tight seal between each set of such cylindrical sealing surfaces upon radial expansion of the sealing components at a second relatively higher operating temperature, each of the first and second cylindrical sealing components of each thermal seal having a differential thermal expansion coefficient $\Delta K_t$ larger than about $1.5 \times 10^{-6}$ per °C.

2. A filter assembly in accordance with claim 1, in which the first sealing component is an integral part of each end cap of the filter element.

3. A filter assembly in accordance with claim 2, in which the adaptors each have an annular cylindrical open central passage therethrough connecting with the passage through the end cap, and the first annular recess is in the internal wall of the passage against which the annular flange seals in a thermal seal.

4. A filter assembly in accordance with claim 1, in which the sealing components are each of metal.

5. A filter assembly in accordance with claim 4, in which the sealing components are each stainless steel alloys of differing coefficients of expansion.

6. A filter assembly in accordance with claim 1, in which the first sealing component associated with the filter element has a lesser coefficient of expansion than the second sealing component associated with the filter unit structure.

7. A filter assembly in accordance with claim 1, in which the first sealing component associated with the filter element has a greater coefficient of expansion than the second sealing component associated with the filter unit structure.

8. A cylindrical filter element for disposition in a filter assembly across the line of flow of fluid therethrough in sealing relationship in the assembly via a seal that is thermally expanded at operating temperature, the filter assembly comprising a housing; a fluid chamber in the housing; a fluid inlet and a fluid outlet in the housing in flow communication with the fluid chamber; the cylindrical filter element being disposed in the fluid chamber across the line of flow from the inlet to the outlet through the filter assembly and having a filter sheet in the form of a cylinder whose open ends are capped by end caps having open central passages therethrough; the thermally expanded seal being made between components consiting of a first cylindrical sealing component operatively associated with each of the end caps of the filter element and comprising an annular axial flange extending axially and outwardly from the end caps about the central passages thereof; for sealing thermally with a second cylindrical sealing component operatively associated with the first cylindrical sealing component, and formed for operative association with the filter assembly housing and comprising cylindrical adaptors having on one side a first annular recess into which the annular flanges of the end caps fit; the end cap flange adaptors and first annular recess together constituting one set of first and second thermally sealing components having cylindrical and concentric portions whose opposed mating cylindrical concentric side surfaces are side-to-side sealing surfaces, one adaptor having on its other side a second annular recess for embracing an annular projection on the housing; the second annular recess and the housing projection constituting another set of first and second thermally sealing components associated respectively with the filter element and with the housing; there being a small clearance between such cylindrical sealing surfaces within the range from about 0.0004 to about 0.002 inch at a first relatively lower nonoperating temperature, and a leak-tight seal between such cylindrical sealing surfaces upon radial expansion of the sealing components at a second relatively higher operating temperature, each of the first and second cylindrical sealing components of each thermal seal having a differential thermal expansion coefficient $\Delta K_t$ larger than about $1.5 \times 10^{-6}$ per °C.

9. A filter element in accordance with claim 8, in which the first sealing component is an integral part of each end cap of the filter element.

10. A filter element in accordance with claim 9, in which the annular cylindrical adaptors have an open central passage therethrough connecting with the passage through the end cap, and have an annular recess in the internal wall of the passage against which the annular flanges seal in a thermal seal.

11. A filter element in accordance with claim 8, in which the sealing components are each of metal.

12. A filter element in accordance with claim 11, in which the sealing components are each of stainless steel alloys of differing coefficients of expansion.

13. A cylindrical filter element for coupling to another cylindrical filter element to form a coupled filter element in sealing relationship in a filter assembly via a seal that is thermally expanded at operating temperatures, the filter assembly comprising, in combination, a housing; a fluid chamber in the housing; a fluid inlet and a fluid outlet in the housing in flow communication with the fluid chamber; the coupled cylindrical filter elements being disposed in the fluid chamber across the line of flow of fluid from the inlet to the outlet through the filter assembly, each filter element having a filter sheet in the form of a cylinder whose open ends are capped by end caps having open central passages therethrough; the thermally expanded seal being made between components consisting of a first cylindrical sealing component operatively associated with each of the end caps of the filter elements comprising an annular axial flange extending axially and outwardly from the end caps about the central passages thereof; and a second cylindrical sealing component operatively associated with the annular axial flanges constituting the first cylindrical sealing component, and formed for operative association with each filter element to couple them together, and comprising cylindrical adaptors having on each side annular recesses into which the annular flanges of end caps of abutting filter elements fit; the end cap flanges and annular adaptors constituting first and second thermally sealing components having cylindrical and concentric portions whose opposed mating cylindrical concentric side surfaces are side-to-side sealing surfaces, there being a small clearance between such sealing cylindrical sealing surfaces within the range from about 0.0004 to about 0.002 inch at a first relatively lower nonoperating temperature and a leak-tight seal between such cylindrical sealing surfaces upon radial expansion of the sealing components at a second relatively higher operating temperature, each of the first and second cylindrical sealing components of each thermal seal having a differential thermal expansion coefficient $\Delta K_t$ larger than about $1.5 \times 10^{-6}$ per °C.

14. A filter element in accordance with claim 13, in which the first sealing component is an integral part of each end cap of the filter element.

15. A filter element in accordance with claim 14 in which the annular cylindrical adaptors have an open central passage therethrough connecting with the passage through the end cap, and have an annular recess in the internal wall of the passage, against which the annular flanges seal in a thermal seal.

16. A filter element in accordance with claim 13, in which the sealing components are each of metal.

17. A filter element in accordance with claim 16, in which the sealing components are each of stainless steel alloys of differing coefficients of expansion.

* * * * *